June 8, 1954
R. P. RUSSELL
2,680,416
APPARATUS FOR FORMING UNDERGROUND
DRAINAGE AND IRRIGATION OPENINGS
Original Filed Jan. 19, 1950
3 Sheets-Sheet 1
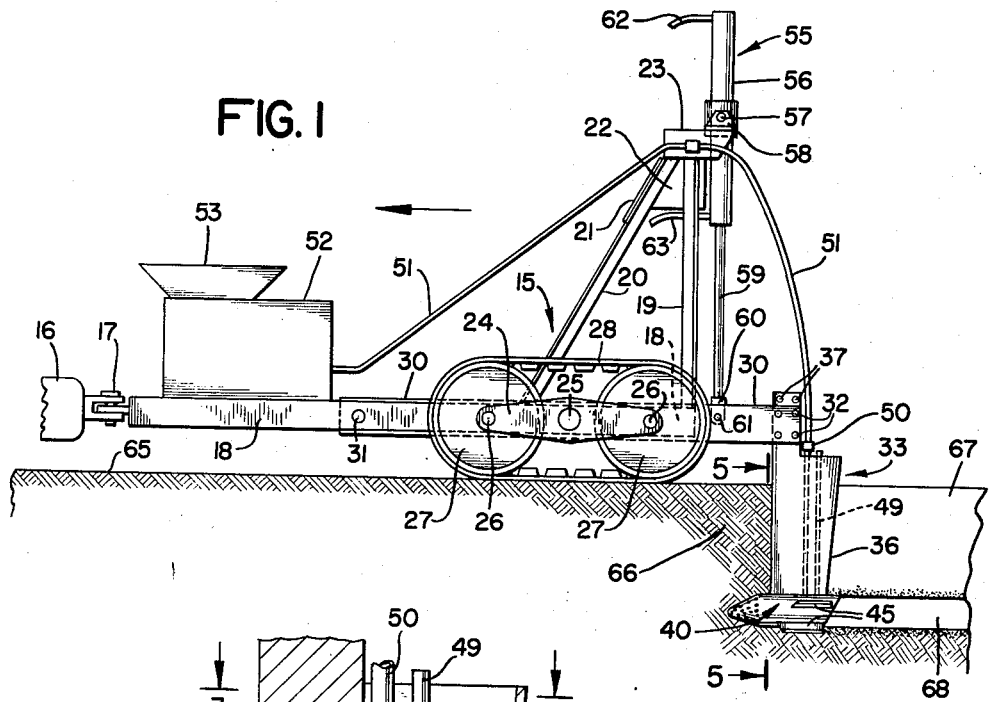
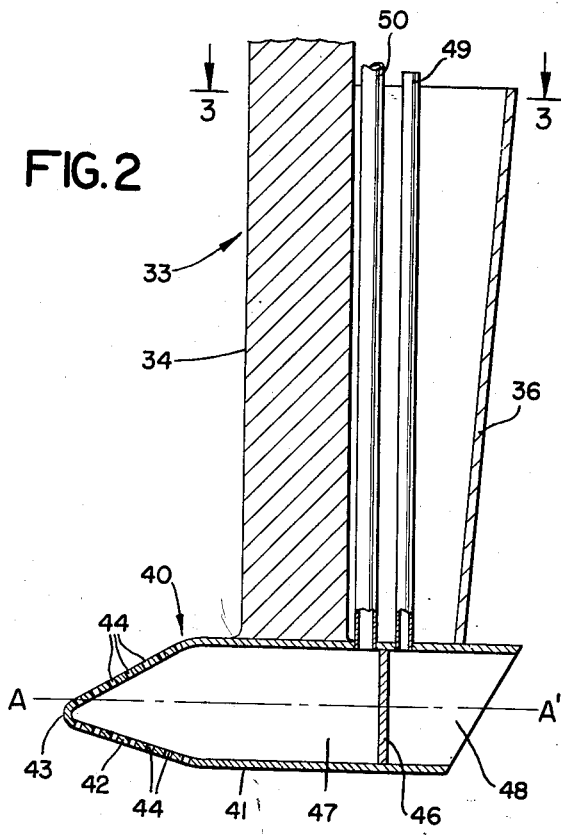
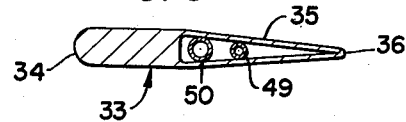
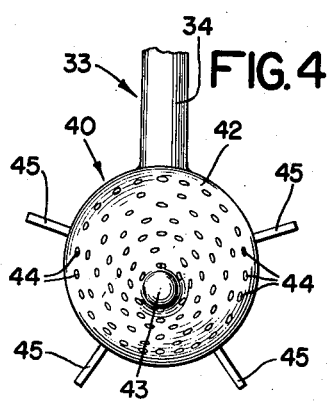
INVENTOR.
ROBERT P. RUSSELL
BY
*F. J. Pisarra*
ATTORNEY.

June 8, 1954  R. P. RUSSELL  2,680,416
APPARATUS FOR FORMING UNDERGROUND
DRAINAGE AND IRRIGATION OPENINGS
Original Filed Jan. 19, 1950  3 Sheets-Sheet 2
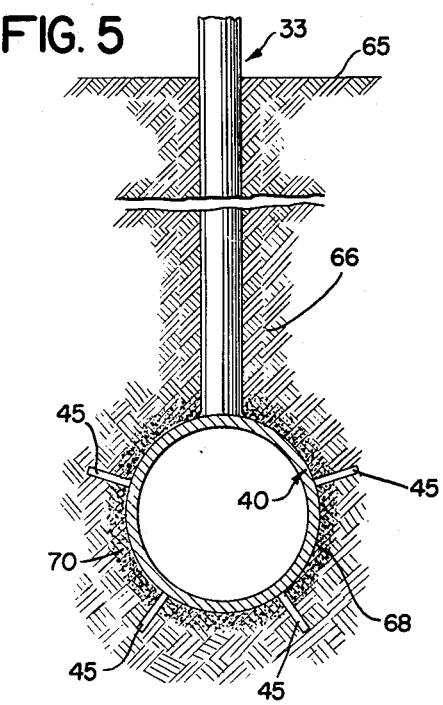
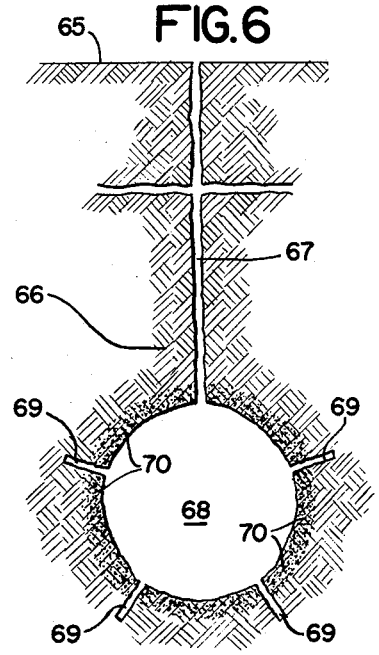
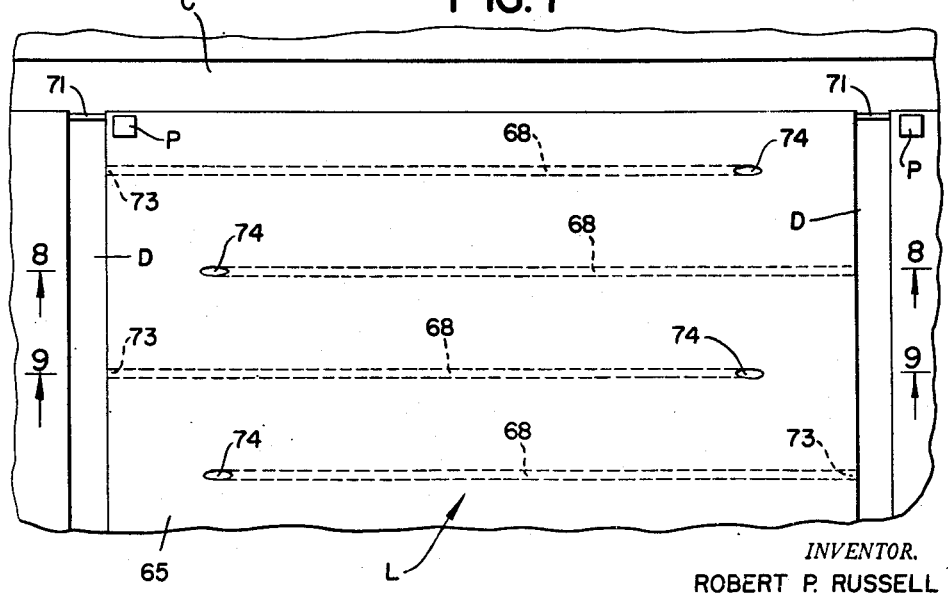
INVENTOR.
ROBERT P. RUSSELL
BY
*F. J. Pisarra*
ATTORNEY.

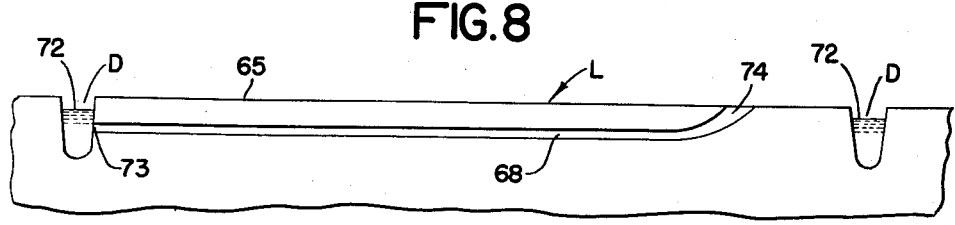
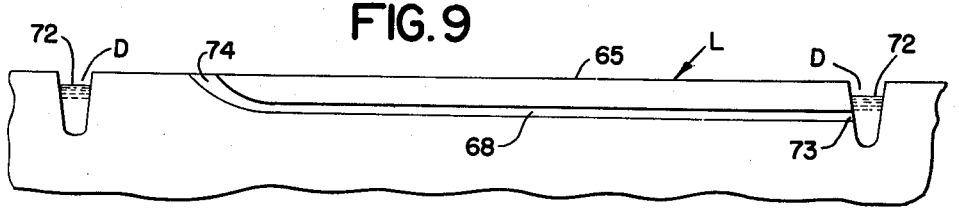
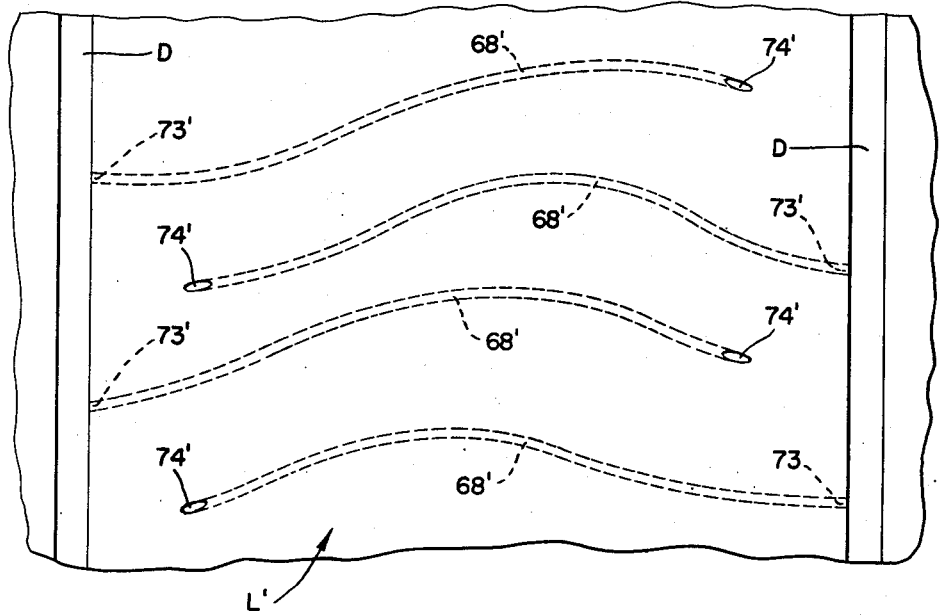
INVENTOR.
ROBERT P. RUSSELL
BY
ATTORNEY.

Patented June 8, 1954

2,680,416

UNITED STATES PATENT OFFICE 2,680,416

APPARATUS FOR FORMING UNDERGROUND DRAINAGE AND IRRIGATION OPENINGS

Robert P. Russell, Lantana, Fla., assignor to International Basic Economy Corporation, New York, N. Y., a corporation of New York Original application January 19, 1950, Serial No. 139,492. Divided and this application March 24, 1951, Serial No. 217,372

1 Claim. (Cl. 111—5)

This invention relates to the formation of underground openings, and more specifically to apparatus for forming underground openings substantially wholly below and generally parallel to the surface of the earth for purposes of soil drainage and irrigation.

This application is a division of my application Serial No. 139,492, filed January 19, 1950.

It is a primary object of the invention to provide an improved apparatus for forming underground drainage and irrigation openings.

Another object of the invention is to provide apparatus for forming a drainage and irrigation opening substantially wholly below the surface of the earth and having a porous soil defining wall impregnated with a suitable material to prevent collapse thereof upon being subjected to normal surface load conditions over an extended period of time.

Another object of the invention is to provide apparatus for forming an underground opening that is adapted for use in attaining adequate drainage or irrigation of flat parcels of land or contour-terraced parcels of land.

The invention has for another object the provision of apparatus for forming a drainage and irrigation opening below the surface of the earth and simultaneously strengthening portions of the soil defining the opening to prevent collapse of surrounding soil into the opening.

A further object of the invention resides in simultaneously forming in the earth an elongated opening substantially wholly below and generally parallel to the surface of the earth; impregnating portions of the soil defining the opening with a suitable material to prevent collapse of surrounding soil into the opening, while permitting water, introduced into the opening, to pass through the impregnated soil or permitting moisture in the soil to pass through the impregnated soil into the opening; and forming, wholly below the surface of the earth, one or more passages that communicate with the opening, are substantially coextensive with the opening, and extend through the impregnated soil.

A still further object of the invention is to provide sub-surface openings of the character indicated that may be formed at a reasonable cost, and that are capable of performing their intended functions in an effective manner.

Considerable work has been done in recent years in the reclamation of land for agricultural purposes by providing underground drainage and irrigation systems. Generally speaking, such systems have comprised an irrigation canal and spaced-apart ditches for transmitting water from and to the canal. Underground conduits communicating with the ditches transmit water for irrigation purposes to the land during dry periods, and conduct moisture from the land to the ditches during wet periods. The water for irrigation purposes is generally pumped from the canal into the ditches and drainage water is pumped from the ditches into the canal, depending upon whether the system is being used for irrigation or drainage purposes.

One of the principal difficulties encountered in the formation of underground drainage and irrigation openings having soil walls is that the soil in many localities does not possess compaction characteristics capable of withstanding the weight of surrounding soil or usual surface loads to which the earth is subjected in the course of present-day agricultural operations. As a result, the opening-defining portions of the soil and adjacent soil collapse into the openings, thereby obstructing the openings and preventing adequate passage of water into or from the soil by way of the openings.

The practice of the present invention eliminates this difficulty as it provides underground drainage and irrigation openings defined by soil which is strengthened or reenforced by impregnation with a suitable material capable of preventing collapse of surrounding soil for prolonged periods of time. Various materials may be used for this purpose, including asphalt emulsions alone or with a suitable wetting agent, depending upon the composition of the specific soil. The wetting agent may be, and preferably comprises, a fatty acid mixture of amines, consisting principally of palmetic, oleic and stearic amines. Other soil impregnating materials that may be advantageously used in the practice of the invention include cement slurries and cut-back asphalt compositions. The selected impregnated material is used in an amount sufficient to prevent collapse of the opening-defining and adjacent soil, while not materially reducing the porosity of the soil.

It may be desirable in certain instances to provide for more rapid transmission of moisture from the soil into the opening or from the opening into the soil. To this end, passages communicating with the opening are formed in and extend through the impregnated soil. Such passages are formed simultaneously with the formation of the opening and impregnation of the soil defining the opening.

The enumerated objects, as well as other objects, together with the advantages of the invention, will be readily understood by persons skilled in the art upon reference to the following detailed description, taken in conjunction with the annexed drawings.

In the drawings:

Figure 1 is a view in side elevation of apparatus constructed in accordance with the invention in the process of forming an underground drainage and irrigation opening;

Figure 2 is an enlarged central vertical cross-sectional view through the knife blade and "mole" shown in the lower right hand portion;

Figure 3 is a view taken along line 3—3 of Figure 2;

Figure 4 is an end elevation view in enlargement of the opening-forming apparatus shown in Figure 2, as viewed from the left thereof;

Figure 5 is a view in enlargement taken along line 5—5 of Figure 1;

Figure 6 is a view corresponding to Figure 5, the underground opening-forming apparatus being omitted to show the underground opening, communicating passages, and vertical slot formed by the apparatus;

Figure 7 is a plan view of a flat parcel of land having drainage and irrigation openings formed therein by apparatus of the character shown in Figures 1 through 5;

Figure 8 is a sectional view taken along line 8—8 of Figure 7;

Figure 9 is a sectional view taken along line 9—9 of Figure 7; and

Figure 10 is a plan view of a portion of a parcel of contour-terraced land having drainage and irrigation openings formed therein by apparatus of the character shown in Figures 1 through 5.

Referring now to the drawings wherein like reference characters denote corresponding parts throughout the several views, and more particularly to Figure 1, a trailer 15 is adapted to be drawn in the direction indicated by the arrow by a suitable motor-driven vehicle, such as a tractor, not shown except for its rear extremity 16, which is pivotally coupled to the trailer by a pin 17. The trailer comprises a base frame 18 that carries a pair of vertically disposed angle members 19 and a pair of obliquely disposed angle members 20. Only one of each of angle members 19 and 20 is shown in the drawings, the other being disposed directly behind and in spaced relation to the corresponding one shown in Figure 1. The angle members are joined together at their upper ends by a plurality of plates 21, 22 and 23 to obtain a rigid structure. A rock arm 24 is pivotally connected to each end of a shaft 25 that is mounted in base frame 18 and carries at each end an axle 26 for a corresponding sprocket wheel 27. Pairs of sprocket wheels are engaged by a caterpillar track 28, as shown.

A lever 30 is pivotally connected at one end to frame 18, as indicated at 31. Secured to the other end of the lever by bolts 32 is a hollow knife blade 33 having a rounded leading edge 34. Rear portion 35 of the knife blade is tapered and terminates in a trailing edge 36. The knife blade is provided with a plurality of bolt holes 37 to permit of adjustment of the blade with respect to lever 30.

A means or "mole" 40 for forming underground openings in the earth is rigidly attached to the lower end of the knife blade by welding or in any other manner known to the art. The mole is best shown in Figures 1, 2 and 4 and comprises a hollow, generally bullet-shaped body 41 open at its rearward end and provided with a nose 42 at its forward end. The external surface of the nose is generally conical in configuration and terminates in a tip 43 that is disposed below the longitudinal axis A—A' of the body (Figure 2). A plurality of radially and longitudinally spaced through ducts 44 in the nose establish communication between the interior and the exterior of the mole. A series of radial fins 45 are secured to and spaced circumferentially about the mole body. These fins are all positioned rearward of nose 42. An imperforate partition 46 is positioned across the interior of the body and divides the same into a forward compartment 47 and a rearward compartment 48.

A conduit 49, positioned within blade 33, communicates with compartment 48 and serves as an air vent to prevent creation of a vacuum behind the mole in the course of forming an underground opening. A second conduit 50, also in the knife blade, communicates with compartment 47 and is connected by a line 51 (Figure 1) to a receptacle 52 that contains the material for strengthening and reenforcing the wall of the underground opening. The receptacle also contains a pumping means (not shown) for transmitting the material under pressure through line 51, conduit 50, compartment 47, and ducts 44, in the order named. A supply of the wall reenforcing material is placed in receptacle 52 by way of a hopper 53, as required.

In Figure 1 is shown a hydraulic mechanism 55 for raising and lowering lever 30 and with it the knife blade 33 and mole 40 about pivot 31. The hydraulic mechanism includes a cylinder 56 having trunnions 57 that are pivotally mounted in brackets 58 that are attached to plates 23. A piston (not shown) is disposed within cylinder 56 and is provided with a piston rod 59 that has a clevis 60 at its free end for pivotal connection with lever 30, as indicated at 61. A pair of lines 62 and 63 is adapted to transmit fluid under pressure from a source (not shown) into opposite ends of cylinder 56.

Reference is next had to Figures 1 and 5 which show the apparatus of the invention in the process of forming a drainage and irrigation opening in the soil. The surface of the earth is indicated by numeral 65 and the sub-soil by numeral 66. The apparatus is adapted to cut a vertical slot 67 and simultaneously form an irrigation and drainage opening 68 and passages 69 (Figure 6) that communicate with opening 68 and extend through the soil which defines the opening and is impregnated with particles 70 of reenforcing material, such as a suitable asphalt emulsion or the like.

Figures 7, 8 and 9 represent views of a parcel of land L having drainage and irrigation openings formed therein by means of the above-described apparatus. A canal C supplies water for irrigation purposes during dry periods and receives drainage water during wet periods. A pair of widely spaced drainage ditches D, preferably at right angles to the general course of the canal, is separated from the canal by dams or the like 71. A pumping station P is provided to transmit irrigating water from the canal into a corresponding ditch, or drainage water from the ditch into the canal, as required. The level of the water in ditches D during irrigation is indicated at 72 in Figures 8 and 9.

In forming an opening 68, trailer 15 is placed so that lever 30 may be swung about pivot 31 to position mole 40 in a ditch D. Knife blade 33 may be adjusted with respect to lever 30 so that the drainage and irrigation opening formed by the apparatus will be at the desired depth, for example, between 18 and 36 inches. The trailer is then drawn by a tractor in the direction indicated by the arrow in Figure 1 so that nose 42 of the mole penetrates the sub-soil at 73. Continued movement of the trailer toward the left, as viewed in Figure 1, effects formation of slot 67 by knife blade 33, opening 68 by mole 40, and passages 69 by fins 45. Simultaneous with movement of the mole through the soil, the reenforcing material is pumped from receptacle 52 through line 51 and conduit 50 into compartment 47, whence it is discharged through ducts 44 into the soil. The reenforcing material so discharged impregnates portions of the soil defining opening 68. The extent of such impregnation should be sufficient to prevent collapse of surrounding soil into the opening without unduly reducing the porosity of the soil. Slot 67 is relatively narrow and will be closed by soil movement due to surface loads. Any soil that drops into opening 68 during closing of slot 67 will not materially reduce the size of opening 68. By virtue of nose tip 43 being below the longitudinal axis A—A' of body 41, the mole tends to nose downwardly during formation of an opening. This tendency is, of course, opposed by the trailer so that the major portion of the length of opening 68 is substantially parallel to earth surface 65. The mole is withdrawn from the soil at 74 while the trailer is still moving forward by operating hydraulic mechanisms 55 in a manner to swing lever 30 in a counter-clockwise direction about pivot 31, as viewed in Figure 1.

Figure 10 represents a contour-terraced parcel of land L' having drainage and irrigation openings formed therein, in accordance with the invention. The points of entry of the mole in the soil in the course of forming openings 68' are indicated at 73' and the points of exit are indicated at 74'.

From the foregoing, it is believed that the construction, operation, and advantages of my present invention will be readily comprehended by persons skilled in the art. It is to be clearly understood, however, that various changes in the apparatus set forth above may be made without departing from the scope of the invention, it being intended that all matter contained in the description or shown in the drawings shall be interpreted as illustrative only and not in a limiting sense.

I claim:

In apparatus of the character described, an upstanding hollow blade having a forwardly disposed leading edge and a rearwardly disposed trailing edge, a hollow, generally bullet-shaped body secured to the lower end of the blade, the longitudinal axis of the body being substantially horizontal and lying in a plane that passes through the leading and trailing edges of the blade, said body being closed at its forward end and open at its rearward end, the closed end of the body comprising a nose having a plurality of ducts establishing communication between the interior and the exterior of the body, an imperforate partition across the interior of the body dividing the same into a forward compartment and a rearward compartment, means comprising a first conduit within the blade for transmitting fluid material under pressure into the forward compartment and thence through the ducts, and a second conduit within the blade communicating with the rearward compartment.

References Cited in the file of this patent

UNITED STATES PATENTS

| Number | Name | Date |
| --- | --- | --- |
| 123,092 | Divelbiss et al. | Jan. 30, 1872 |
| 1,218,727 | Watson | Mar. 13, 1917 |
| 1,314,279 | McCrary | Aug. 26, 1919 |
| 1,340,836 | Powell | May 18, 1920 |
| 1,416,691 | Crozier | May 23, 1922 |
| 1,808,974 | Wilkens | June 9, 1931 |
| 1,905,975 | Thomas | Apr. 25, 1933 |